April 20, 1937.   B. RIDGEWAY   2,078,020
CLUTCH MECHANISM
Filed March 14, 1934   3 Sheets-Sheet 1
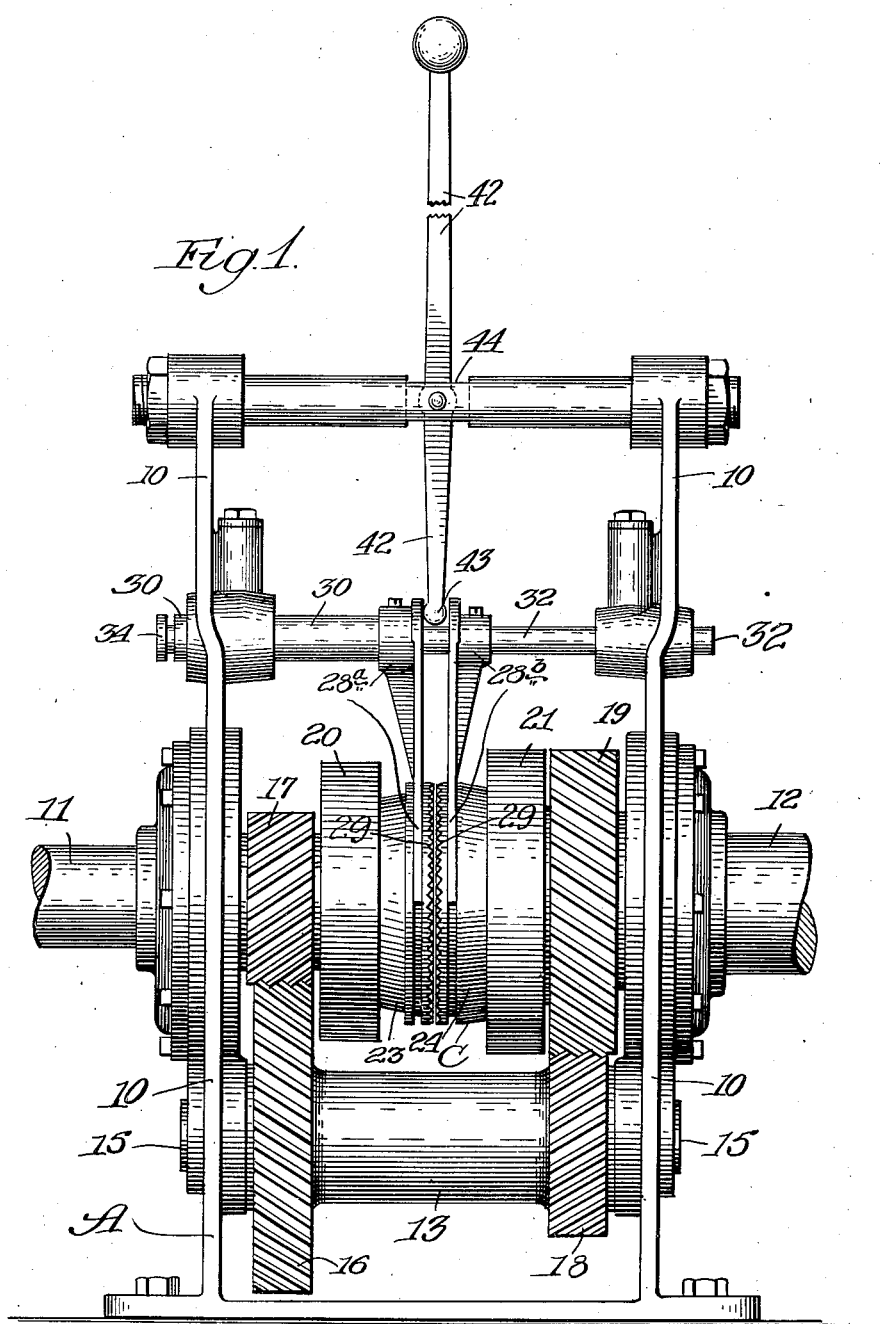

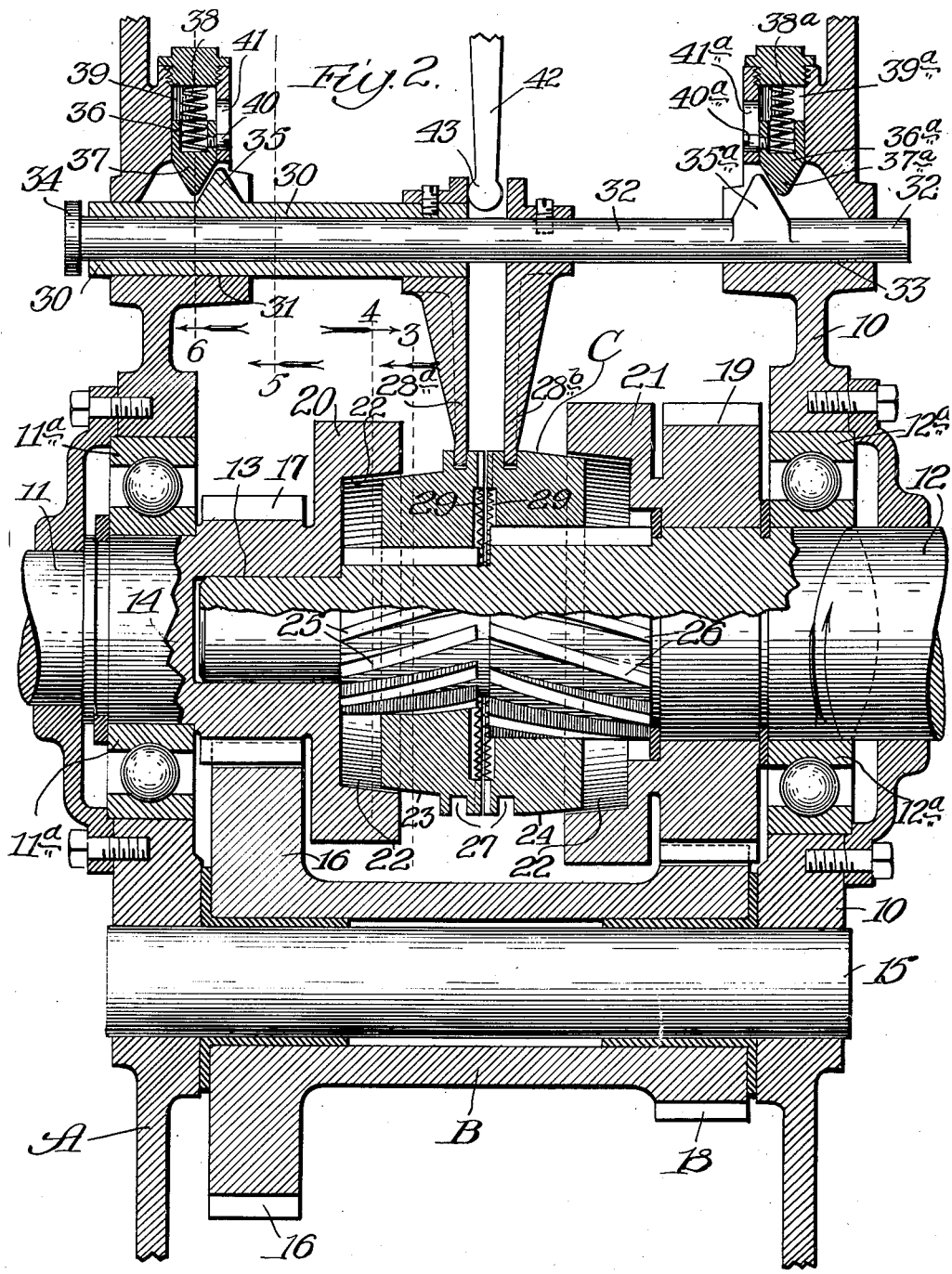

April 20, 1937.  B. RIDGEWAY  2,078,020
CLUTCH MECHANISM
Filed March 14, 1934   3 Sheets-Sheet 3
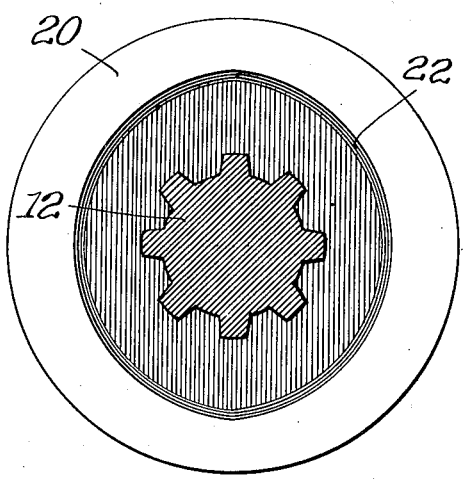
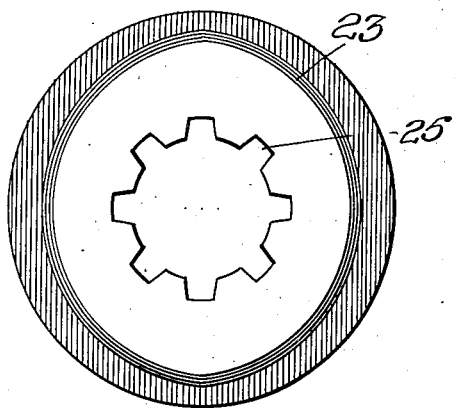
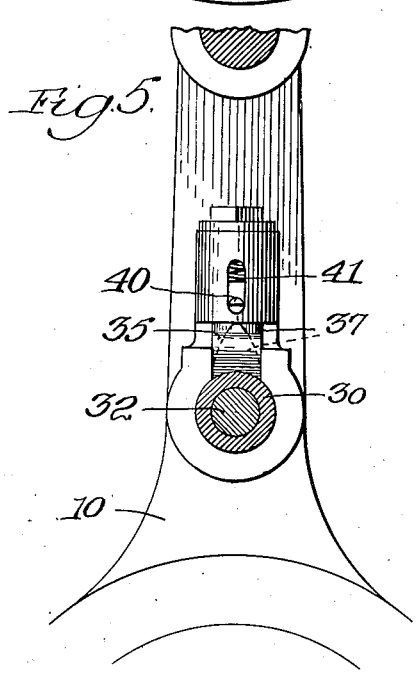
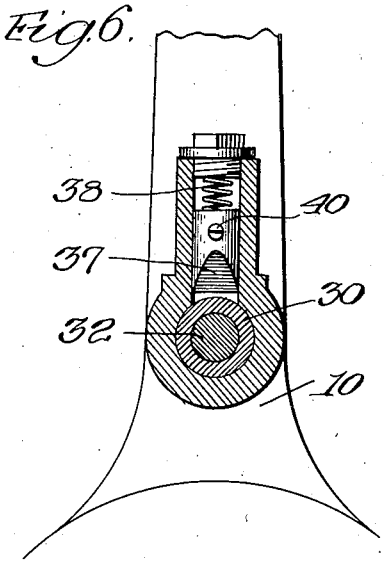
Inventor:
Bruce Ridgeway Patented Apr. 20, 1937

2,078,020

UNITED STATES PATENT OFFICE 2,078,020

CLUTCH MECHANISM

Bruce Ridgeway, Mexico, Mo.

Application March 14, 1934, Serial No. 715,525

7 Claims. (Cl. 192—53)

This invention relates to clutch mechanism and the like. The mechanism is particularly useful as a synchronizing clutch.

An object of the invention is to provide improved clutch mechanism of simple and sturdy construction. A further object is to provide synchronizing clutch mechanism adapted to connect shafts rotating at different speeds after substantially equalizing the speeds of such shafts. Other specific objects and advantages will appear as the specification proceeds.

The invention is illustrated, in a preferred embodiment, by the accompanying drawings, in which—

Figure 1 is an open view in elevation of transmission and clutch mechanism embodying my invention; Fig. 2, an enlarged longitudinal sectional view; Fig. 3, a detailed view taken along line 3 of Fig. 2; Fig. 4, a front face view of the inner clutch element, the view being taken as indicated at line 4 of Fig. 2; Fig. 5, a broken sectional view, the section being taken as indicated at line 5 of Fig. 2; and Fig. 6, a broken sectional view, the section being taken as indicated at line 6 of Fig. 2.

In the illustration given, the clutch mechanism is illustrated in connection with a simplified transmission. For the purpose of clearness, only two speeds are provided for. It will be understood, however, that the mechanism may be employed with the regular transmission of an automobile, etc. by making simple and clearly understood changes.

In the drawings, A designates the supporting frame; B, the transmission; and C, the clutch mechanism.

The frame A consists of supporting standards 10 in which is mounted on one side, a drive shaft 11 and on the other side, a driven shaft 12. The drive shaft 11 is recessed at 13 to receive the reduced extension 14 of driven shaft 12. The shafts 11 and 12 are supported within the standards 10 by suitable ball bearings 11ª and 12ª respectively.

The transmission mechanism B connecting shafts 11 and 12 may be of any suitable construction. The jack-shaft 15, rotatably supported by standards 10, carries a gear 16 meshing with the pinion 17 on shaft 11. Similarly, a pinion 18 on shaft 15 meshes with a gear 19 rotatably mounted on shaft 12.

The clutch mechanism C, in the preferred form illustrated, includes outer clutch elements 20 and 21, each of which is provided with an inwardly inclined recess 22 having the oblong or somewhat elliptical shape shown more clearly in Fig. 3. The clutch element 20 is integrally formed with shaft 11, while the outer clutch element 21 is integrally formed with gear 19 which is rotatably mounted on shaft 12. The inner clutch elements 23 and 24 are provided with inclined drum walls corresponding in shape to the recesses 22 but adapted to be received therein. The element 23 is secured by spiral splines 25 to a forward reduced portion of shaft 12, while the inner element 24 is secured by spiral splines 26 to a larger portion of shaft 12. It will be noted that the splines 25 and 26 run at divergent angles to each other. The members 23 and 24 are provided with grooves 27 adapted to receive the shifting forks 28ª and 28ᵇ. On their inner adjacent faces, the members 23 and 24 are provided with annular rows of interlocking teeth 29, such teeth serving to connect the two members together when the faces thereof are brought into contact. However, when the faces of the two clutch elements 23 and 24 are not brought together, the rows of teeth 29 are not in contact and the clutch parts may operate independently.

The shifting forks 28ª and 28ᵇ are carried by different members. The fork 28ª is fixed to a sleeve 30 slidably mounted within a bearing 31 of standard 10. The fork 28ᵇ is fixed to a shaft 32 slidably mounted within bearing 33 of standard 10. The shaft 32 slides within sleeve 30 and is provided at one end with a head 34 adapted to engage the adjacent free end of sleeve 30. The sleeve 30 is provided on one side with a substantially V-shaped cam 35. A plunger 36 having a V-shaped head 37 is supported above cam 35 and in longitudinal alignment therewith. The plunger 36 is urged downwardly by spring 38 housed within a chamber 39 provided by the vertical standard 10. A pin 40 engages a slot 41 within a side wall of the standard 10 and guides the plunger for vertical movement. The shaft 32 is also provided near its end with a cam 35ª substantially the same as cam 35 on sleeve 30. Upon the standard 10 adjacent cam 35ª are supported parts 36ª, 37ª, 38ª and 40ª with openings 39ª and 41ª, such parts and openings being similar to those described in connection with cam 35 of sleeve 30.

For shifting the forks 28ª and 28ᵇ, I employ a shifting lever 42 of conventional design having a ball end 43. It will be noted that the ball 43 does not completely fill the space between the two shifting forks, but a small space is left which is substantially equal to the space between the inner faces of clutch members 23 and 24, or more accurately, between the rows of teeth on such faces. As shown more clearly in Fig. 1, the lever 42 is pivoted to shaft 44 carried by standards 10.

A transmission housing (not shown) will ordinarily be employed to enclose the aligned shafts and connecting gears and shifting clutch mechanism, the shaft 32 and sleeve 30 being preferably left outside of the housing for ease in assembly.

In the operation of the mechanism, assuming that it is desired to go into low gear, the gear shift lever is moved forwardly so as to thrust the fork 28b rearwardly, thus bringing the inner clutch member 24 against the outer clutch member 21. A telescoping engagement of the inner and outer clutch members 24 and 21 will not take place at once if the driving and driven shafts are turning at different speeds, but the engagement of the two clutch members will tend to bring the speeds of the two shafts together so that the inner clutch member may then slip into the recess 22 of clutch member 21. By employing clutch members having their contacting faces of elliptical or irregular curvature, quick engagement of the parts is prevented until their speeds are almost the same. Shifting of the inner clutch members is made possible by the use of spiral splines. As long as power is being transmitted through the driving shaft, the spiral splines 26 will tend to hold inner clutch member 24 in engagement with outer clutch member 21. When the speed of the driven shaft, however, exceeds the speed of the driving shaft, the inner clutch member 24 does not tend to move away from clutch member 21 because of engagement with clutch member 23. The engagement of teeth 29 on the two inner clutch members locks them together and by reason of the different angular direction of the splines 25 and 26, the two inner clutch members become fixed to shaft 12.

The shifting mechanism illustrated causes the two inner clutch members, when one is shifted forwardly into engagement with an outer clutch member, to be locked firmly together so that no movement of the engaging inner clutch member is permitted. For example, when the clutch member 24 is moved forwardly into engagement with outer clutch member 21, as above described, the cam 35a carried by shaft 32 is pressed past the plunger 37a. As the cam passes the plunger 37a, the inclined face of the plunger tends to move the cam 35a still farther to the right. This movement draws head 34 against sleeve 30 and brings the inner clutch member 23 into contact with the inner clutch member 24, with the teeth 29 of the two parts in interlocking engagement. It will be noted that the intervening space between the ball 43 and forks 28a and 28b provides just sufficient space to enable the two clutch members to be brought together. As set out above, the slack or space between the ball 43 and one of the shifting forks is equal to the distance between the teeth 29 of the two inner clutch parts when they are in the neutral position shown in Fig. 2.

After sufficient speed has been obtained in the low gear position, the shift lever 42 is moved rearwardly so as to force the shifting fork 28a in a forward direction and thus bring the inner clutch member 23 against the outer clutch member 20. As soon as the frictional engagement of parts 23 and 20 brings about a matching of the speeds of the driving and driven shafts, the inner clutch member 23 can be drawn forward into telescoping engagement with clutch part 20, the elliptical faces of the two parts being brought into alignment. At the same time, the forward movement of sleeve 30 engages head 34 and moves shaft 32 forwardly. The cam 35 after passing the plunger 37 is further moved forwardly by the inclined forward face of plunger 37 so as to bring fork 28b and clutch part 24 forwardly into engagement with the rear face of inner clutch member 23, and with the teeth 29 of the two parts in interlocking engagement. Should the speed of the driven shaft 12 tend to exceed the speed of driving shaft 11, rearward movement of inner clutch member 23 is prevented by the interlocking engagement of the two inner clutch members mounted on the angularly related spiral splines 25 and 26.

While I have described the clutch parts as being useful as synchronizing clutch mechanism, it will be noted that the parts are also useful in other clutch combinations and particularly in automatic transmissions. For example, the clutch parts herein described may be used with the automatic transmission described in my copending application, Serial No. 638,199, for Transmissions. The clutch mechanism may not only be used with automobile transmissions, but also may be used with boat-driving mechanism, electric drills, etc.

It will be observed that in the operation of the clutch parts as synchronizing mechanism, that the inner clutch member yieldably engages its corresponding outer clutch member and does not enter the recess of the outer member until the speeds of the two parts are almost the same. In actual operation, the shifting movement is accomplished with ease, and the clutch engagement is brought about quickly and without jarring or clashing.

The foregoing detailed description has been given for clearness of understanding only, and no unnecessary limitations should be understood therefrom, but the appended claims should be construed as broadly as permissible, in view of the prior art.

I claim:

1. Clutch mechanism adapted to be used with aligned driving and driven shafts, comprising a clutch member secured to one of said shafts, a cooperating clutch member slidably secured to the other shaft, said clutch members being provided with telescoping contacting faces having their peripheral outline deviating from a true circle, means for shifting said slidable clutch member, and means slidably mounted on the same shaft with said slidable member for locking said slidable clutch member in engagement with said first mentioned clutch member.

2. In combination with a pair of aligned driving and driven shafts, a pair of cooperating clutch members secured one to each of said shafts and at least one of said members being slidably secured to its shaft by spiral splines, said clutch members being provided with telescoping inclined faces having their peripheral outline deviating from a true circle, and means for preventing separation of said clutch members when the speed of the driven shaft tends to exceed that of the driving shaft.

3. In combination with aligned driving and driven shafts, a pair of outer clutch members, one on each of said shafts, inner clutch members secured by angularly related spiral splines to said driven shaft, means for shifting said inner clutch members into engagement with their corresponding outer clutch members, said inner clutch members being provided with interlocking teeth on their inner adjacent sides, and means for holding said inner clutch members in contacting relation and with said teeth in interlocking engagement.

4. In synchronizing clutch mechanism of the character set forth, a pair of outer clutch members, a pair of inner clutch members slidably mounted therebetween on spiral splines, each of said inner and outer cooperating clutch members having substantially elliptical contacting faces, said inner clutch members being rotatable independently of each other, and means for simultaneously shifting said clutch members in one direction so that one of the inner clutch members engages its corresponding outer clutch member.

5. In synchronizing clutch mechanism of the character set forth, a pair of outer clutch members, a pair of inner clutch members, said inner clutch members being slidably mounted between said outer clutch members and carried by angularly related spiral splines, means on the inner faces of said inner clutch members for locking the members together when said inner faces are brought together, means for shifting one of said inner clutch members into engagement with its corresponding outer clutch member and for simultaneously shifting the other inner clutch member to a point adjacent said first mentioned inner clutch member, and spring-pressed means for further shifting said second mentioned inner clutch member into interlocking engagement with said first mentioned inner clutch member.

6. In synchronizing clutch mechanism of the character set forth for connecting aligned driving and driven shafts, spiral splines secured to one of said shafts in adjacent relation, the splines on the shaft running in different directions, friction clutch mechanism preventing the connection of the two shafts until their speeds are substantially matched, and means associated with said clutch mechanism slidably engaging said spiral splines and cooperating with said clutch mechanism for connecting the two shafts when their speeds are substantially the same.

7. In combination with a pair of aligned shafts, at least one of said shafts being provided with two sets of curved splines, said sets being supported adjacent each other upon different sized portions of said shaft, and the splines of one set running in a different direction from those of the other set, members mounted on said shaft at least one of which is slidably secured to its shaft by the splines thereon, said members being adapted to be brought into contact, and means for connecting said members at their contacting sides.

BRUCE RIDGEWAY.